Aug. 14, 1934.  B. S. SNOW  1,970,203
METHOD OF SOFTENING WATER AND WATER TREATING AND STORAGE APPARATUS
Original Filed March 2, 1931  2 Sheets-Sheet 1
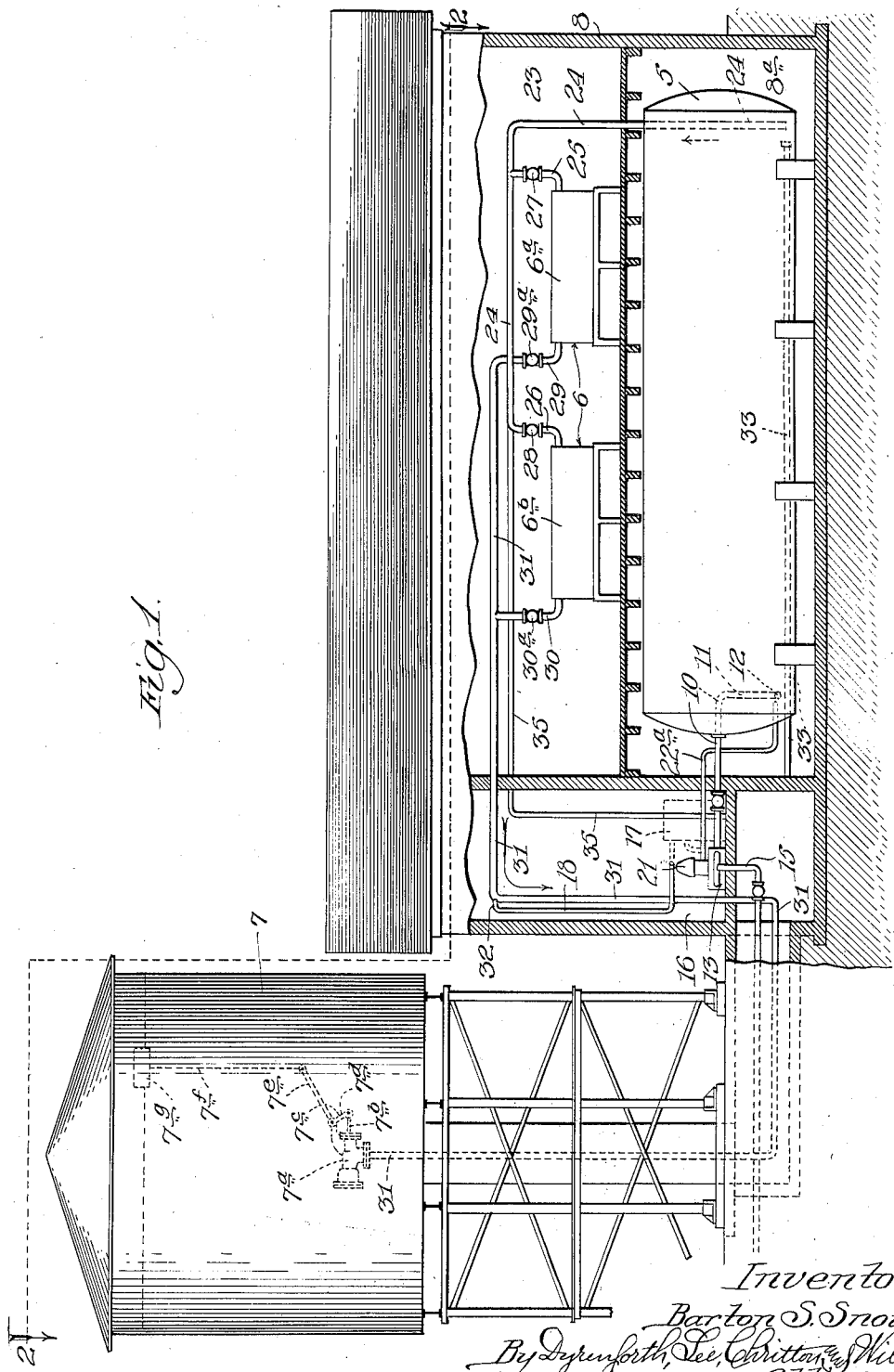

Aug. 14, 1934. B. S. SNOW 1,970,203
METHOD OF SOFTENING WATER AND WATER TREATING AND STORAGE APPARATUS
Original Filed March 2, 1931   2 Sheets-Sheet 2
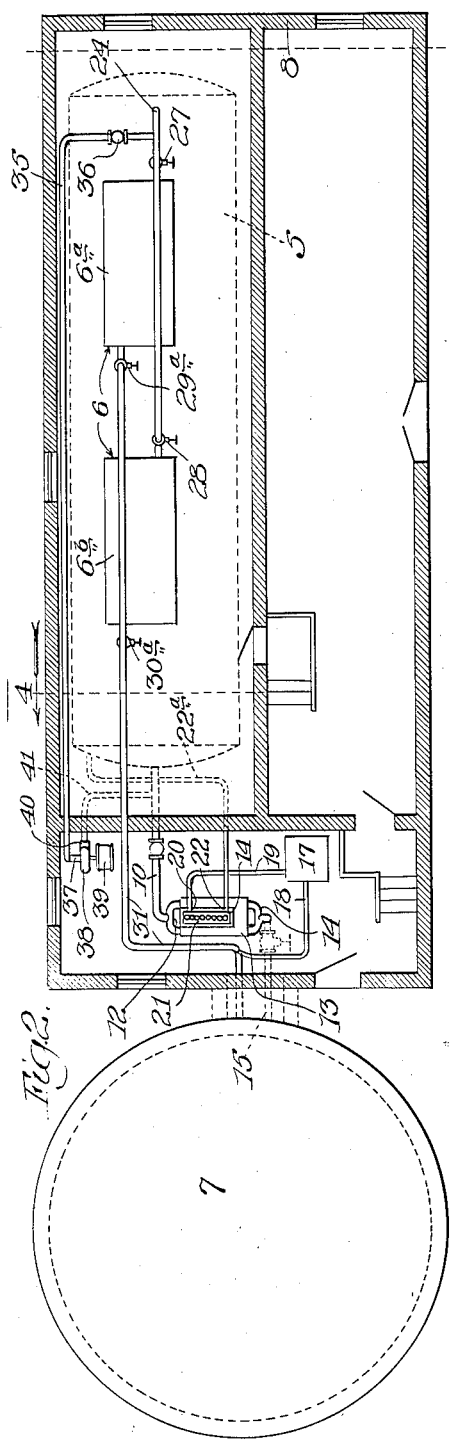
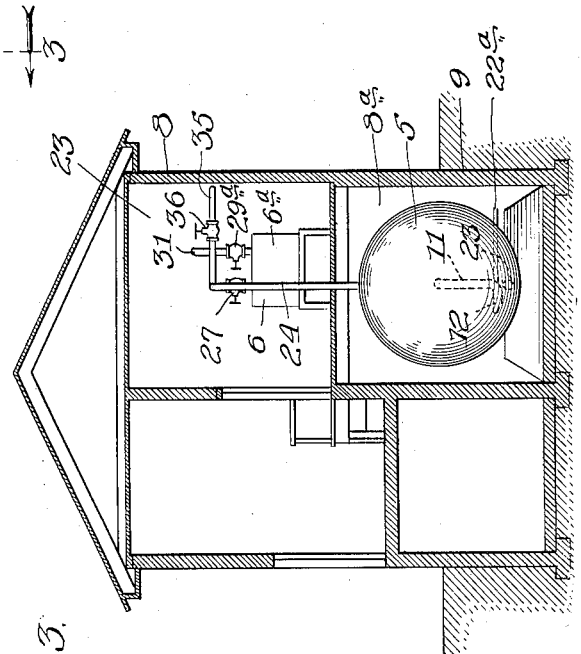
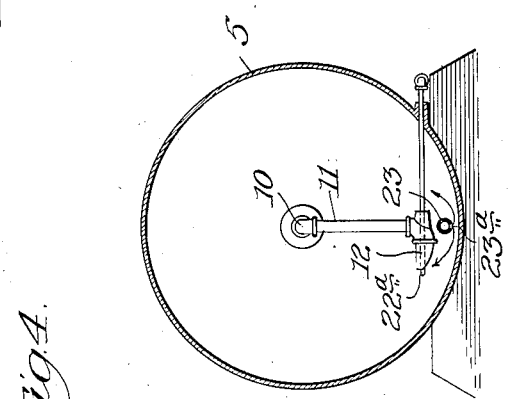
Inventor:
Barton S. Snow,
By Dyrenforth, Lee, Chritton & Wiles,
Att'ys Patented Aug. 14, 1934

1,970,203

UNITED STATES PATENT OFFICE 1,970,203

METHOD OF SOFTENING WATER AND WATER-TREATING AND STORAGE APPARATUS

Barton S. Snow, Wheaton, Ill., assignor to T. W. Snow Construction Company, Chicago, Ill., a corporation of Illinois Application March 2, 1931, Serial No. 519,532
Renewed June 30, 1934

12 Claims. (Cl. 210—16)

My invention relates more particularly to the chemical treatment of water to render it "soft" or to clarify it, as for example to better adapt it for use in boilers, and in which treatment sludge, or so-called "floc", is produced which it is required be removed from the water before the latter is rendered suitable for use.

The time required for effecting those chemical reactions which produce the floc or sludge is comparatively short. However, as water-treating apparatus has hitherto been provided, the time required for the reactions above referred to is much shorter than that required for the clarification of the water by removal of the sludge, as the separation of the sludge from the water includes a settling operation requiring a minimum of five hours.

Thus apparatus operating on the sludge-settling principle must provide tank equipment of such large capacity, and consequent expense, that provision be made for the holding of the treated water for a prolonged period to permit of the settling of the sludge to the desired degree. In some types of installations separate tanks for mixing, settling and storing the water are provided and in others a mixing tank and a combined settling and storage tank are provided, but in each type the equipment must have a capacity permitting of the desired settling of the sludge.

My primary object is to provide improvements in method of treating water and in water-treating apparatus to the end that the time required for the chemical treatment and the clarification of the water, and the cost of the equipment, be greatly reduced; and waste of water substantially eliminated.

Another, more specific, object is to dispense with the pit for receiving the sludge removed from the water-treating apparatus and required in the use of water-treating apparatus as hitherto provided, particularly as such pits are expensive to produce and require the use of relatively large ground-areas.

Another object is to dispense with the sludge-collecting manifold provided as a part of the gravity settling equipment of apparatus as hitherto provided; and other objects as will be manifest from the following description.

Referring to the accompanying drawings:

Figure 1 is a view in elevation, with certain parts broken away and sectioned, of water-treating apparatus constructed in accordance with my invention and suitable for practicing my improved method.

Figure 2 is a plan sectional view taken at the irregular line 2—2 on Fig. 1 and viewed in the direction of the arrows.

Figure 3 is a section taken at the line 3—3 on Fig. 2 and viewed in the direction of the arrow; and Figure 4, an enlarged, sectional, view taken at the line 4 on Fig. 2 and viewed in the direction of the arrow.

Referring to the particular illustrated construction of water-treating and storage apparatus, it comprises a tank 5 shown as, and by preference, a pressure tank, into which the raw water and the water-treating material are introduced and mixed, a filter press 6 through which the treated water is passed to remove the solid particles from the water and a storage tank 7 for receiving the clarified treated water and from which the water is dispensed for use.

The pressure tank 5, shown as located in a lower compartment 8ª of a housing 8 and which may be located in a pit 9 dug in the ground, is supplied with the raw water to be treated through a pipe 10 shown as extending into the tank 5 through an end of the latter, and having a downwardly-extending leg 11 terminating in a laterally directed nozzle 12 located adjacent the bottom portion of the tank 5 and so positioned, as shown, as to cause the water issuing therefrom to discharge tangentially of the side wall of the tank for producing swirling of the water in the tank.

The pipe 10 is shown as connected with the outlet 12 of a water-driven motor 13 the inlet of which, represented at 14, is connected with a pipe 15 which leads to the supply (not shown) of raw water to be treated, as for example a service main under substantially uniform pressure, the motor 13 being shown as mounted in an end compartment 16 of the housing 8.

Chemical-solution producing means diagrammatically illustrated at 17 and of any suitable construction and from which is supplied the chemical solution for treating the water in the tank 5, connects with a pipe 18, supplied with water as hereinafter described, for directing into the apparatus 17, water for conveying the water-treating chemical to the water to be treated, and which may be of any desired kind as for example a combination of lime and soda ash or barium and lime. The outlet of the apparatus 17 for the water and chemical is connected with a pipe 19 which opens into the inlet 20 of a pump 21 driven by the water-motor 13, the outlet 22 of the pump 21 being connected with a pipe 22ª which opens into the tank 5, the pipe 22ª preferably extending at its outlet into and through the nozzle 12, and spaced from the inner wall of the nozzle.

The filter-press 6 shown as formed of two separate units 6ᵃ and 6ᵇ is located in the upper compartment 23 above the compartment 8ᵃ, the units 6ᵃ and 6ᵇ being connected with a system of piping in communication with the interior of the tank 5, as by a pipe 24 which extends downwardly into the tank to a position in which its lower, open, end reaches to within a slight distance of the bottom of the tank.

The system of piping referred to is provided of such construction that the treated water to be clarified may be selectively directed through the filter-press units 6ᵃ and 6ᵇ whereby provision is made for removing the filter cakes from the press units alternately without interrupting the filtering operation.

The system of piping shown comprises pipe-leads 25 and 26 from the pipe 24 which open, respectively, into the inlets of the filter-press units 6ᵃ and 6ᵇ and are provided with hand-valves 27 and 28, respectively; and pipes 29 and 30 provided with hand valves 29ᵃ and 30ᵃ which open into the outlets of the filter press units 6ᵃ and 6ᵇ, respectively, and contact with a pipe 31 through which the clarified, treated, water is conducted to the storage tank 7, which, it will be understood, may be of any desirable construction such as for example as commonly provided for the storing and dispensing of treated water and having means which operate automatically to close the tank to the supply of treated water when the water in this tank reaches a predetermined level, and shown as comprising a valve 7ᵃ mounted on the upper, outlet, end of the pipe 31 and opening into the tank 7, the stem 7ᵇ of the valve being connected with the arm 7ᶜ of a bell crank lever 7ᵈ, the outer arm 7ᵉ of which is connected by a cable 7ᶠ with a float 7ᵍ which floats on the body of water in the tank 7.

As it is desirable that the water for mixture with the chemical in apparatus 7 be treated water, the pipe 18 may be, and preferably is, connected with the pipe 31 as represeneted at 32 whereby a small proportion of the water flowing in the pipe 31 flows through the pipe 18.

In the operation of the apparatus, in so far as it is above described, the water to be treated and supplied through the pipe 10 to the tank 5, mixes with the treating material supplied thereto through the pipe 22ᵃ, by the swirling action produced by the tangential water-jet, the water, which fills the tank 5, under pressure, flowing through the one of the filter press units 6ᵃ and 6ᵇ which, pursuant to the manipulation of the valves referred to, communicates therewith, wherein the sludge is removed from the treated water thus clarifying it, the clarified water flowing through the pipe 31 into the storage tank 7.

In the operation of water-treating apparatus of the general construction shown the water is usually drawn from the storage tank intermittently and thus between periods of withdrawal the mixture in the tank 5 is quiescent, whereby the sludge in the tank 5 may accumulate in the bottom thereof, and present a possibility of caking or densifying to such an extent as not to be dislodged and mixed with the water in tank 5 when water again is forced into the tank through pipe 10.

To ensure the dislodgment and remixing of the accumulated sludge referred to with the water in the tank 5, the tank 5 is provided with a pipe 33 which extends lengthwise thereof approximately throughout the length of the latter a slight distance above the bottom of the tank and is provided at intervals therealong with downwardly-opening outlets 23ᵃ, water being supplied to this pipe for the downwardly jetting of water therefrom through its outlets against the accumulated sludge in the tank, by means of a pipe 35 valved at 36 and connected at one end with the pipe 24 between the tank 5 and the lead-pipe 25 and at its other end with the inlet 37 of a pump 38 driven by a motor 39, the outlet 40 of the pump connecting with a pipe 41 opening into the outer end of the pipe 23.

The means just described and involving the pump 38 may also, if desired, as for example in cold weather, or where inferior chemicals are used, be employed for augmenting the agitation of the mixture of water and chemical in the tank 5 to accelerate the chemical reactions.

It will be understood from the foregoing that the tank 5 need be no larger than is necessary to ensure the retention of the water therein substantially for the length of time requisite to complete those reactions which produce the sludge under all conditions of withdrawal of the water from the tank 5, and thus this tank may be of relatively small size.

Furthermore, by providing for the removal of the sludge by a filtering action, tank-equipment to provide for the settling of the sludge with consequent expense and a sludge-collecting manifold and sludge pit are dispensed with, the use of the the minimum amount only of water is required, and the sludge, in the form of dry filter cakes, and which is in a condition to be used commercially, as for example as fertilizer, may be easily and conveniently handled.

As is well known the reaction between the water and the chemical is proportionate to the temperature thereof the reaction being faster with warmer water. In this connection the use of a pressure tank, or an open tank associated with means to force the water therefrom into the filter press, instead of a gravity tank, (the use of which latter, however, is within my invention as to certain phases thereof) is of advantage because it may be protected from the weather in cold climates within economical limits. If the tank is located on the surface of the ground the cost of a housing for same with means for heating it, if desired, is not great, and if buried in the ground, and whether heated or not, the ground protects it against the weather. Furthermore, no allowance in designing the tank or supporting it need be made for wind-pressure.

In the arrangement shown the protecting effect produced by locating the tank 5 in the ground is availed of and in addition heat is supplied to the tank by heating means (not shown) for the housing and located, by way of example, exterior of the compartment 8ᵃ, in which case the floor of compartment 23 would preferably contain openings (not shown) to permit of the circulation of heated air through the compartment 8ᵃ.

While I have illustrated and described a particular construction of apparatus embodying my invention and have shown and described a particular construction of apparatus for the practicing of my improved method, I do not wish to be understood as intending to limit it thereto as the apparatus may be variously modified and altered and the method practiced by other apparatus without departing from the spirit of my invention and in this connection, and as by way of example, it may be stated that so far as certain features of my invention are concerned the tank 5 may be open at its top and a pump used for pumping from this tank to the filter press.

What I claim as new and desire to secure by Letters Patent, is:

1. Water-treating apparatus comprising a cylindrical tank positioned on its side and in which the water is treated by water-treating material, and means whereby the water and water-treating material in the tank are caused to swirl circumferentially therein.

2. Water-treating apparatus comprising a cylindrical tank positioned on its side and in which the water is treated by water-treating material, and means whereby the water and water-treating material introduced in the tank at one end thereof are caused to swirl circumferentially therein in the travel of the mixture thereof to the opposite, outlet, end of the tank.

3. Water-treating apparatus comprising a cylindrical tank positioned on its side and in which the water is treated by water-treating material, and a nozzle through which the water to be treated is introduced into said tank opening into said tank and positioned to cause the water to discharge tangentially of the side wall of the tank to cause the water to swirl circumferentially therein.

4. Water-treating apparatus comprising a cylindrical tank positioned on its side and in which the water is treated by water-treating material, means whereby the water and water-treating material introduced in the tank at one end thereof are caused to swirl circumferentially therein in the travel of the mixture thereof to the opposite, outlet, end of the tank, and an outlet pipe for the treated water opening into said tank closely adjacent the bottom thereof.

5. Water-treating apparatus comprising a tank in which the water is treated by water-treating material, means whereby the water and water-treating material in the tank are caused to swirl therein, and means for dislodging and remixing with the swirling water in the tank sludge accumulated on the bottom of the tank.

6. Water-treating apparatus comprising a cylindrical tank positioned on its side and in which the water is treated by water-treating material, means whereby the water and water-treating material in the tank are caused to swirl therein, and means for dislodging accumulations of sludge on the bottom of said tank for mixture with the swirling water therein.

7. Water-treating apparatus comprising a cylindrical tank positioned on its side and in which the water is treated by water-treating material, means whereby the water and water-treating material in the tank are caused to swirl therein, and means for jetting water at intervals along said tank against sludge accumulated on the bottom thereof to dislodge and re-mix the sludge with the swirling water in the tank.

8. Water-treating apparatus comprising a cylindrical tank positioned on its side and in which the water is treated by water-treating material, means whereby the water and water-treating material in the tank are caused to swirl therein, and a pipe located in and extending lengthwise of said tank and having outlets therealong through which water is jetted against sludge accumulated on the bottom of the tank to dislodge and re-mix the sludge with the swirling water in the tank.

9. Water-treating apparatus comprisng a tank in which the water is treated by water-treating material, means whereby the water and water-treating material in the tank are caused to swirl therein, means in communication with said tank for removing the sludge from the treated water, and means for conducting treated water into said tank and jetting it against accumulations of sludge in said tank to dislodge and re-mix the sludge with the swirling water in the tank.

10. The method of treating water which consists in mixing with the water a suitable treating material for rendering insoluble certain soluble salts in the water and producing sludge which it is required be removed to clarify the water, and thereafter subjecting the treated water with all of the sludge produced in the treating operation referred to, to a filtering operation to remove the sludge.

11. Water-treating apparatus comprising a cylindrical tank in which the water is subjected to a treatment rendering insoluble certain soluble salts in the water and in such treatment producing sludge and to which tank raw water and water treating material are automatically supplied to replace treated water delivered therefrom, means whereby the water and water-treating chemical in the tank are caused to swirl circumferentially therein, said tank being of such size that in the functioning of the apparatus to supply treated water in sufficient quantities to meet the maximum requirement therefor, the water will remain in the tank substantially only for such length of time as to permit of the complete reaction between the water and the water treating material, filtering means and means for conducting the water and the sludge to said filtering means.

12. Water-treating apparatus comprising a cylindrical tank positioned on its side and in which the water is subjected to a treatment rendering insoluble certain soluble salts in the water and in such treatment producing sludge and to which tank raw water and water treating material are automatically supplied to replace treated water delivered therefrom, means whereby the water and water treating material introduced into the tank at one end thereof are caused to swirl circumferentially therein in the travel of the mixture thereof to the opposite, outlet, end of the tank, said tank being of such size that in the functioning of the apparatus to supply treated water in sufficient quantities to meet the maximum requirement thereof, the water will remain in the tank substantially only for such length of time as to permit of complete reaction between the water and the water treating material, filtering means and means for conducting the water and the sludge to said filtering means.

BARTON S. SNOW.